United States Patent
Tomazin et al.

(10) Patent No.: US 7,082,516 B1
(45) Date of Patent: Jul. 25, 2006

(54) ALIGNING INSTRUCTIONS USING A VARIABLE WIDTH ALIGNMENT ENGINE HAVING AN INTELLIGENT BUFFER REFILL MECHANISM

(75) Inventors: Thomas Tomazin, Austin, TX (US); William C. Anderson, Austin, TX (US); Charles P. Roth, Austin, TX (US); Kayla Chalmers, Austin, TX (US); Juan G. Revilla, Austin, TX (US); Ravi P. Singh, Austin, TX (US)

(73) Assignees: Intel Corporation, Santa Clara, CA (US); Analog Devices, Inc., Norwood, MA (US)

( * ) Notice: Subject to any disclaimer, the term of this patent is extended or adjusted under 35 U.S.C. 154(b) by 625 days.

(21) Appl. No.: 09/675,817

(22) Filed: Sep. 28, 2000

(51) Int. Cl.
*G06F 9/00* (2006.01)
(52) U.S. Cl. ...................... 712/204; 712/207
(58) Field of Classification Search ................ 712/204, 712/207, 208, 210, 212
See application file for complete search history.

(56) References Cited

U.S. PATENT DOCUMENTS

| 4,439,828 | A | * | 3/1984 | Martin | 712/226 |
| 5,317,701 | A | | 5/1994 | Reininger et al. | |
| 5,809,272 | A | * | 9/1998 | Thusoo et al. | 712/210 |
| 5,822,559 | A | * | 10/1998 | Narayan et al. | 712/214 |
| 5,845,099 | A | | 12/1998 | Krishnamurthy et al. | |
| 5,918,045 | A | * | 6/1999 | Nishii et al. | 712/237 |
| 6,161,172 | A | * | 12/2000 | Narayan et al. | 712/204 |
| 6,260,134 | B1 | * | 7/2001 | Zuraski et al. | 712/210 |
| 6,367,003 | B1 | * | 4/2002 | Davis | 712/208 |
| 6,981,127 | B1 | * | 12/2005 | Singh et al. | 712/204 |

FOREIGN PATENT DOCUMENTS

| EP | 0380854 | 8/1990 |
| EP | 1050796 | 11/2000 |
| JP | 2002-530984 | 6/1985 |

* cited by examiner

*Primary Examiner*—Eddie Chan
*Assistant Examiner*—David J. Huisman
(74) *Attorney, Agent, or Firm*—Fish & Richardson P.C.

(57) ABSTRACT

In one embodiment, a digital signal processor includes look ahead logic to decrease the number of bubbles inserted in the processing pipeline. The processor receives data containing instructions in a plurality of buffers and decodes the size of a first instruction. The beginning of a second instruction is determined based on the size of the first instruction. The size of the second instruction is decoded and the processor determines whether loading the second instruction will deplete one of the plurality of buffers.

12 Claims, 5 Drawing Sheets

ALIGNING INSTRUCTIONS USING A VARIABLE WIDTH ALIGNMENT ENGINE HAVING AN INTELLIGENT BUFFER REFILL MECHANISM

TECHNICAL FIELD

This invention relates to digital signal processors, and more particularly to alignment of instructions of variable widths within a digital signal processor.

BACKGROUND

Digital signal processing is concerned with the representation of signals in digital form and the transformation or processing of such signal representation using numerical computation. Digital signal processing is a core technology for many of today's high technology products in fields such as wireless communications, networking, and multimedia. One reason for the prevalence of digital signal processing technology has been the development of low cost, powerful digital signal processors (DSPs) that provide engineers the reliable computing capability to implement these products cheaply and efficiently. Since the development of the first DSPs, DSP architecture and design have evolved to the point where even sophisticated real-time processing of video-rate sequences may be performed.

DSPs are often used for a variety of multimedia applications such as digital video, imaging, and audio. DSPs may manipulate the digital signals to create and open such multimedia files.

MPEG-1 (Motion Picture Expert Group), MPEG-2, MPEG-4 and H.263 are digital video compression standards and file formats. These standards achieve a high compression rate of the digital video signals by storing mostly changes from one video frame to another, instead of storing each entire frame. The video information may then be further compressed using a number of different techniques.

The DSP may be used to perform various operations on the video information during compression. These operations may include motion search and spatial interpolation algorithms. The primary intention is to measure distortion between blocks within adjacent frames. These operations are computationally intensive and may require high data throughput.

The MPEG family of standards is evolving to keep pace with the increasing bandwidth requirements of multimedia applications and files. Each new version of the standard presents more sophisticated algorithms that place even greater processing requirements on the DSPs used in MPEG compliant video processing equipment.

Video processing equipment manufacturers often rely on application-specific integrated circuits (ASICs) customized for video encoding under the MPEG and H.263 standards. However, ASICs are complex to design, costly to produce and less flexible in their application than general-purpose DSPs.

DESCRIPTION OF DRAWINGS

These and other features and advantages of the invention will become more apparent upon reading the following detailed description and upon reference to the accompanying drawings.

DETAILED DESCRIPTION

Figure 1:
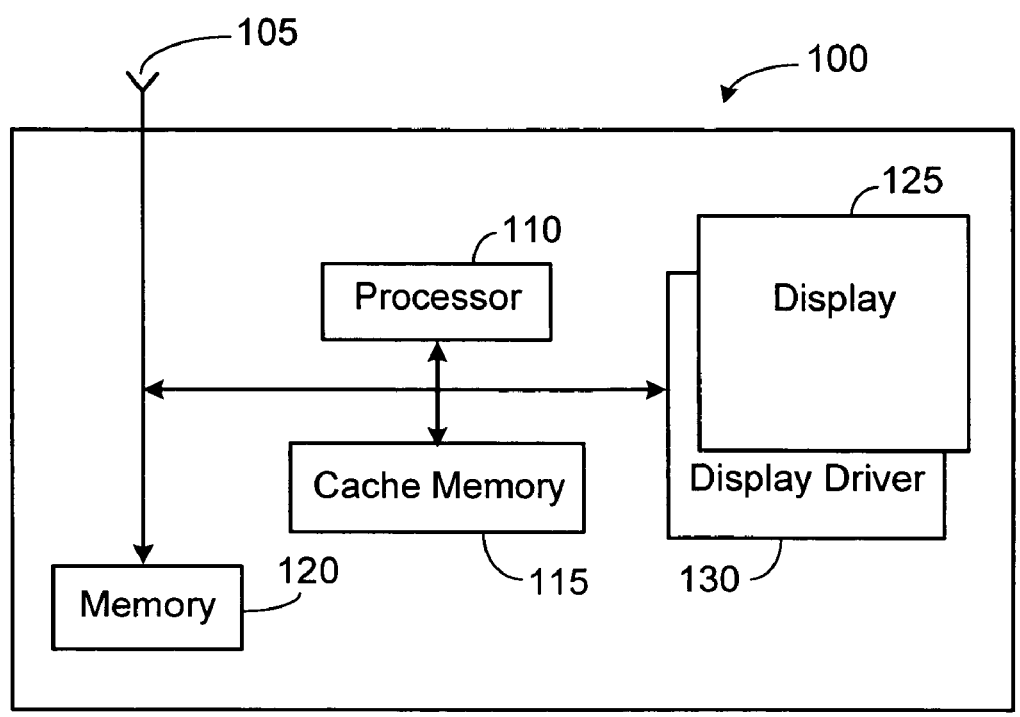
FIG. 1 is a block diagram of a mobile video device utilizing a processor according to one embodiment of the present invention.

FIG. 1 illustrates a mobile video device 100 including a processor according to an embodiment of the invention. The mobile video device 100 may be a hand-held device which displays video images produced from an encoded video signal received from an antenna 105 or a digital video storage medium 120, e.g., a digital video disc (DVD) or a memory card. A processor 110 communicates with a memory 115 (which may be a cache memory) which may store instructions and data for the processor operations. The processor 110 may be a microprocessor, a digital signal processor (DSP), a microprocessor controlling a slave DSP, or a processor with an hybrid microprocessor/DSP architecture. For the purposes of this application, the processor 110 will be referred to hereinafter as a DSP 110.

The DSP 110 may perform various operations on the encoded video signal, including, for example, analog-to-digital conversion, demodulation, filtering, data recovery, and decoding. The DSP 110 may decode the compressed digital video signal according to one of various digital video compression standards such as the MPEG-family of standards and the H.263 standard. The decoded video signal may then be input to a display driver 130 to produce the video image on a display 125.

Hand-held devices generally have limited power supplies. Also, video decoding operations are computationally intensive. Accordingly, a processor for use in such a device is advantageously a relatively high speed, low power device.

The DSP 110 may have a deeply pipelined, load/store architecture. By employing pipelining, the performance of the DSP may be enhanced relative to a non-pipelined DSP. Instead of fetching a first instruction, executing the first instruction, and then fetching a second instruction, a pipelined DSP 110 fetches the second instruction concurrently with execution of the first instruction, thereby improving instruction throughput. Further, the clock cycle of a pipelined DSP may be shorter than that of a non-pipelined DSP, in which the instruction must be fetched and executed in the same clock cycle.

Such a DSP 110 may be used with video camcorders, teleconferencing, PC video cards, and High-Definition Television (HDTV). In addition, the DSP 110 may also be used in connection with other technologies utilizing digital signal processing such as voice processing used in mobile telephony, speech recognition, and other applications.

Figure 2:
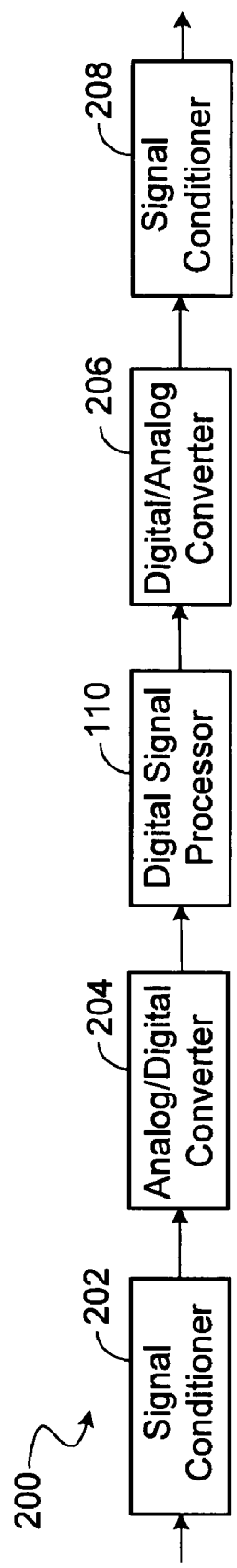
FIG. 2 is a block diagram of a signal processing system according to an embodiment of the present invention.

Turning now to FIG. 2, a block diagram of a signal processing system 200 including DSP 110 according to an embodiment is shown. One or more analog signals may be provided by an external source, e.g., antenna 105, to a signal conditioner 202. Signal conditioner 202 may perform certain preprocessing functions upon the analog signals. Exemplary preprocessing functions may include mixing several of the analog signals together, filtering, amplifying, etc. An analogto-digital converter (ADC) 204 may be coupled to receive the preprocessed analog signals from signal conditioner 202 and to convert the preprocessed analog signals to digital signals consisting of samples, as described above. The samples may be taken according to a sampling rate determined by the nature of the analog signals received by signal conditioner 202. The DSP 110 may be coupled to receive digital signals at the output of the ADC 204. The DSP 110 may perform the desired signal transformation upon the received digital signals, producing one or more output digital signals. A digital-to-analog converter (DAC) 206 may be coupled to receive the output digital signals from the DSP 110. The DAC 206 converts the output digital signals into output analog signals. The output analog signals are then conveyed to another signal conditioner 208. The signal conditioner 208 performs post-processing functions upon the output analog signals. Exemplary post-processing functions are similar to the preprocessing functions listed above. It is noted that various alternatives of the signal conditioners 202 and 208, the ADC 204, and the DAC 206 are well known. Any suitable arrangement of these devices may be coupled into a signal processing system 200 with the DSP 110.

Figure 3:
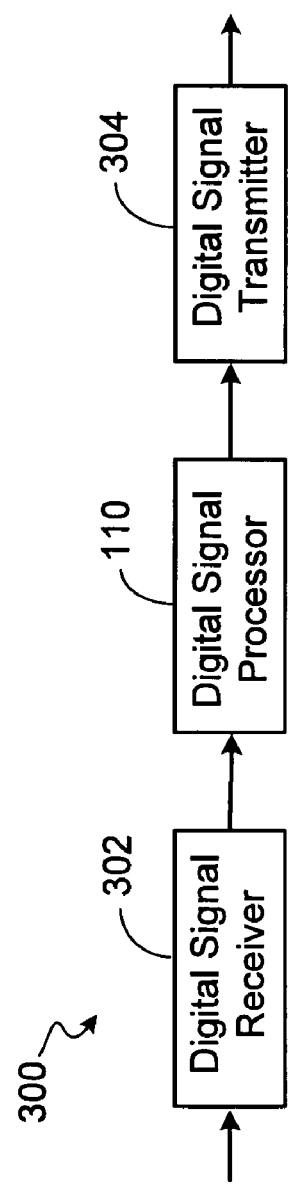
FIG. 3 is a block diagram of an alternative signal processing system according to an embodiment of the present invention.

Turning next to FIG. 3, a signal processing system 300 according to another embodiment is shown. In this embodiment, a digital receiver 302 may be arranged to receive one or more digital signals and to convey the received digital signals to the DSP 110. As with the embodiment shown in FIG. 2 DSP 110 may perform the desired signal transformation upon the received digital signals to produce one or more output digital signals. Coupled to receive the output digital signals may be a digital signal transmitter 304. In one exemplary application, the signal processing system 300 is a digital audio device in which the digital receiver 302 conveys to the DSP 110 digital signals indicative of data stored on the digital storage device 120. The DSP 110 then processes the digital signals and conveys the resulting output digital signals to the digital transmitter 304. The digital transmitter 304 then causes values of the output digital signals to be transmitted to the display driver 130 to produce a video image on the display 125.

Figure 4:
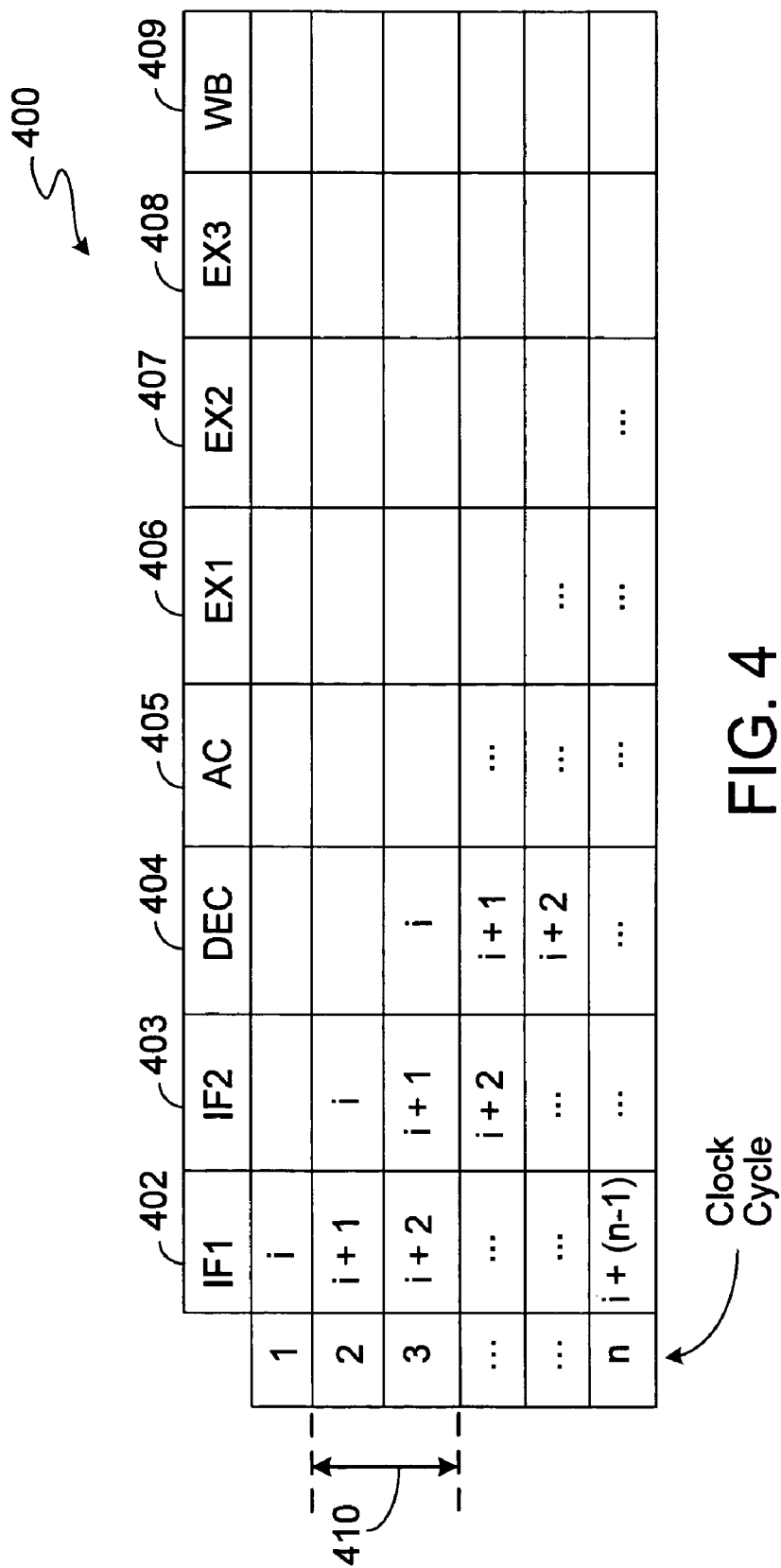
FIG. 4 illustrates exemplary pipeline stages of the processor in FIG. 1 according to an embodiment of the present invention.

The pipeline illustrated in FIG. 4 includes eight stages, which may include instruction fetch 402–403, decode 404, address calculation 405, execution 406–408, and write-back 409 stages. An instruction i may be fetched in one clock cycle and then operated on and executed in the pipeline in subsequent clock cycles concurrently with the fetching of new instructions, e.g., i+1 and i+2.

Pipelining may introduce additional coordination problems and hazards to processor performance. Jumps in the program flow may create empty slots, or "bubbles," in the pipeline. Situations which cause a conditional branch to be taken or an exception or interrupt to be generated may alter the sequential flow of instructions. After such an occurrence, a new instruction may be fetched outside of the sequential program flow, making the remaining instructions in the pipeline irrelevant. Methods such as data forwarding, branch prediction, and associating valid bits with instruction addresses in the pipeline may be employed to deal with these complexities.

Figure 5:
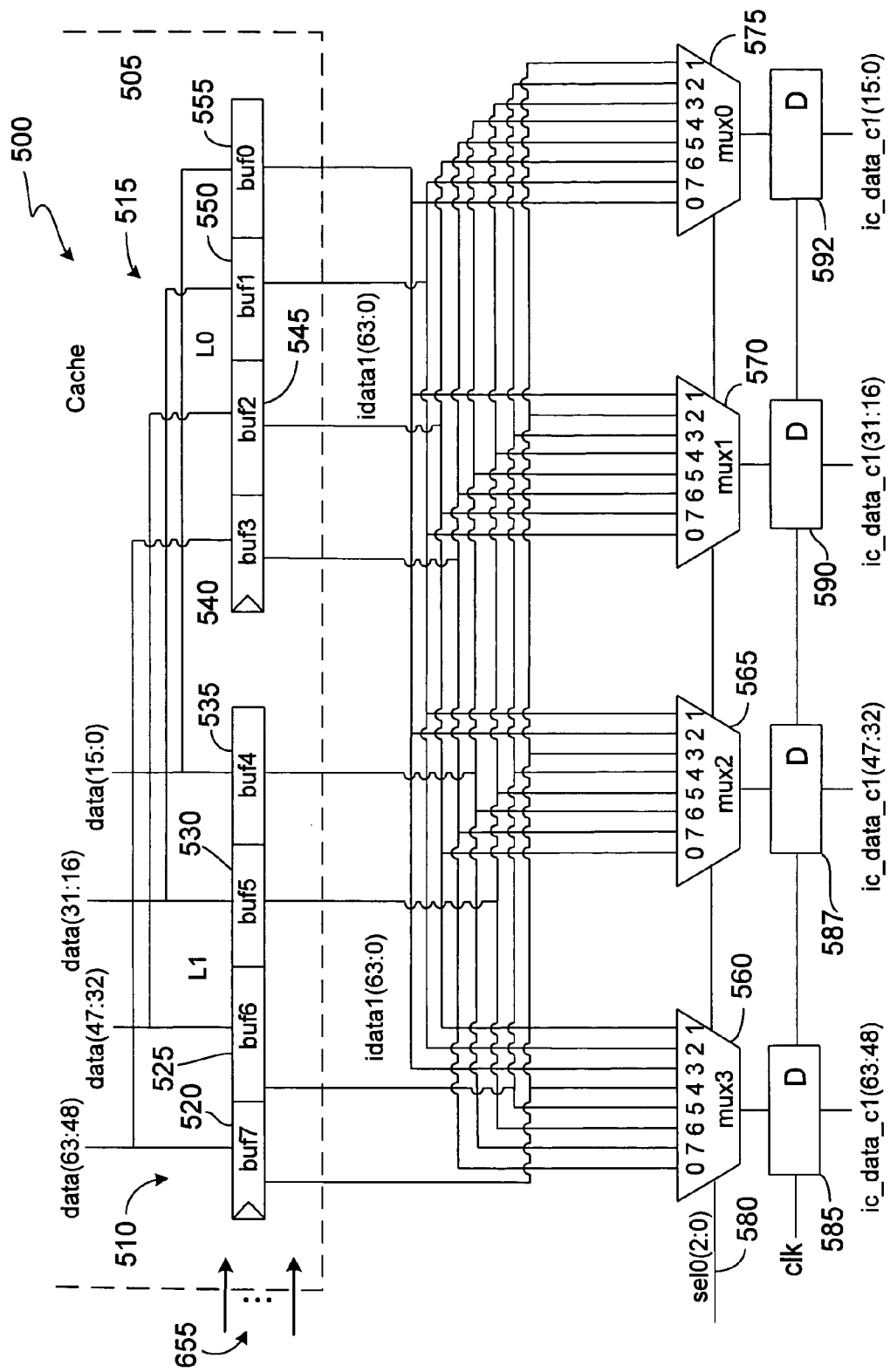
FIG. 5 is a logic diagram of the data flow in an alignment mux according to one embodiment of the present invention.

FIG. 5 is a logic diagram of the data flow 500 in an alignment mux according to one embodiment of the present invention. In the data flow 500, instructions are loaded into the memory 505. The memory 505 includes a plurality of buffers 510, 515 for storing the instructions. In one embodiment, the buffers 510, 515 are 64-bit buffers. The first buffer 510 is divided into a plurality of smaller, 16-bit buffers 520, 525, 530, and 535. The second buffer 515 is also divided into a plurality of smaller, 16-bit buffers 540, 545, 550, and 555. Each of the smaller, 16-bit buffers 520–555 is connected to a plurality of selection multiplexers 560, 565, 570, and 575. Each of the selection multiplexers 560, 565, 570, 575 are connected to a select line 580 to select the output of the multiplexers 560, 565, 570, and 575. The multiplexers 560, 565, 570, and 575 each outputs a 16-bit signal which is stored in a plurality of flops 585, 587, 590, and 592 for use in the pipeline.

The signals stored in the plurality of flops 585, 587, 590, and 592 may represent the instruction to be executed in the pipeline. If the instruction is 16-bits or less, only the first flop 585 may contain data. As the instruction size increases, more of the flops 585–592 will contain data. For example, a 32-bit instruction may have data in the first flop 585 and the second flop 587 while a 64-bit instruction may have data in all the flops 585–592.

An individual instruction may be initially split among the plurality of 16-bit buffers 520–555. For example, a 64-bit instruction may begin in the third buffer 530 and end in the sixth buffer 545. The alignment mux of FIG. 5 ensures that this instruction is aligned prior to processing in the pipeline by transferring the data to the plurality of multiplexers 560–575 and then selecting the proper data to send to the flops 585–592. To reduce the risk that bubbles are inserted in the pipeline, the alignment mux reloads buffers 510, 515 in the memory 505 once all the instruction data in the buffers 510, 515 is dispatched to the pipeline. In one embodiment, the memory 505 may be a cache memory.

The present invention is described using a 64-bit instruction register providing instructions of 64-bits or smaller. Of course, the invention may be accomplished on any size instruction register (N-bit) providing instructions of (N-bits) or smaller. Further, although the present invention is described with two buffers 510, 515, the invention may be scaled to any size to accommodate any number of buffers.

Figure 6:
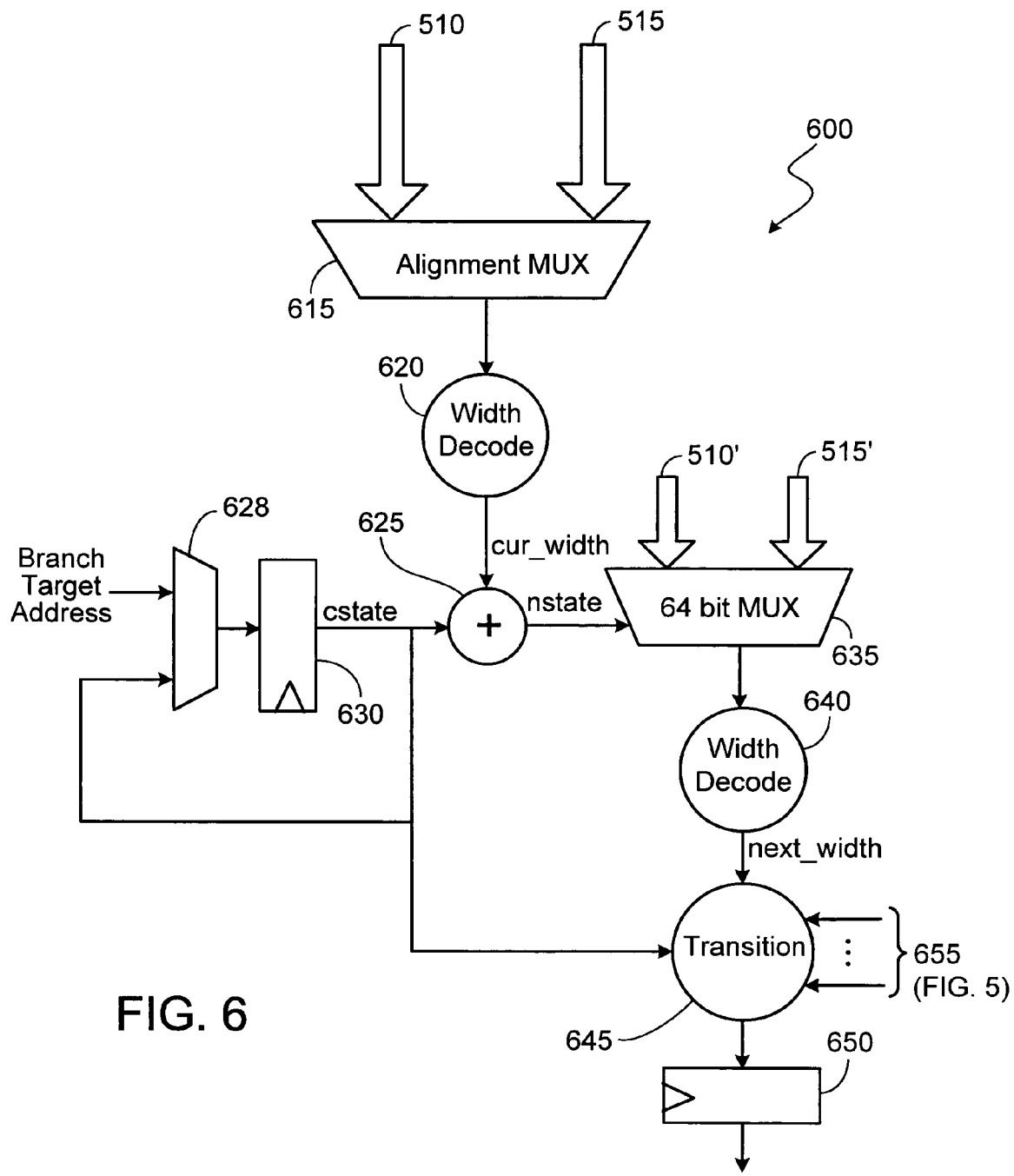
FIG. 6 is a block diagram of an instruction request unit according to one embodiment of the present invention.

FIG. 6 is a block diagram of an instruction request unit 600 according to one embodiment of the present invention. The instruction request unit 600 may look ahead several cycles to determine when the buffers 510, 515 will be emptied so the buffers 510, 515 may be reloaded without any bubbles being introduced into the pipeline in this particular embodiment. The embodiment of the instruction request unit 600 will be described with a cache latency (410, FIG. 4) of 2 cycles. Thus, the instruction request unit should look ahead 2 cycles to ensure the buffers 510, 515 are continually reloaded. It can be appreciated that the present invention may be used in a system have a variety of cache latencies, and the instruction request unit 600 would need to look ahead a number of cycles at least equal to the cache latency to ensure no bubbles are inserted. Of course, the instruction request unit 600 may look ahead less than the cache latency. In this embodiment, bubbles may be inserted into the pipeline.

The instruction request unit 600 receives instruction data from the buffers 510, 515 which are input into an alignment multiplexer 615. The alignment multiplexer 615 may align the current instruction data received from the buffers 510, 515 and outputs individual instructions parsed from the instruction data. The data flow in the alignment multiplexer 615 is described above with reference to FIG. 5. When an individual instruction is received from the alignment multiplexer 615, the instruction is pre-decoded to generate width bits. The width of the instruction (cur_width) is decoded in block 620 from width bits associated with the instruction. In one embodiment, the width bits are a 2-bit signal indicating the width of the current instruction. With a 2-bit signal, there are 4 possible width values. For example, width bits of 00 indicates the instruction is invalid, width bits of 01 indicates a 16-bit instruction, width bits of 10 indicates a 32-bit instruction, and width bits of 11 indicates a 64-bit instruction.

A multiplexer 628 receives a branch target address and the current state (cstate) of the instruction position in the buffers 510, 515. The multiplexer 628 selects either the branch target address or the current state to load the flop 630 with either the current state or the branch target address, which may become the current state. The current state is then combined with the width of the current instruction in block 625. By combining the current state with the current width, the position of the beginning of the next instruction (nstate) may be determined. This position information is then supplied to a second alignment multiplexer 635 to be used in aligning the next instruction. The next instruction position information may also feed back to the flop 630 at the next clock cycle. At the next clock cycle, the next instruction position becomes the current instruction position, and this information is updated in the flop 630. The next instruction position is also supplied to the transition block 645 to aid in determining is a transition from the first buffer 510 to the second buffer 515 has occurred.

The second alignment multiplexer 635 receives as inputs instruction data from the buffers 510' and 515'. The buffers 510' and 515' may be the same as the buffers 510 and 515, or may contain new data. The buffers 510' and 515' may contain new data for the next instruction if the buffers 510 and 515 have been exhausted. The second-alignment buffer 635 aligns the next instruction in the same manner the first alignment buffer 615 aligns the first instruction. The width of the next instruction is then pre-decoded in block 640 to determine the corresponding width bits. The width information (next_width) is then supplied to a transition logic in block 645.

The transition logic determines whether either of the buffers 510 and 515 will be emptied after processing of the next instruction. The transition block 645 includes the next state position and the next instruction width as inputs. The transition block 645 then determines based on the next state position and instruction width whether either of the buffers 510 and 515 will be exhausted after the next instruction. For example, if the next state position indicated is the beginning of the 16-bit buffer 530 and the next instruction width is 64-bits, the transition block 645 determines that the instruction will be taken from the 16-bit buffers 530, 535, 540, and 545, thus completely emptying the first buffer 510. The transition block 645 may then send a signal to the flop 650 indicating that the first buffer 510 is available to be reloaded, which may generate a request to the memory to fill the empty buffer 510.

The transition block 645 may also determine a buffer 510, 515 is depleted by comparing the most significant bits (MSB) of pointers 655 to the buffers 520–555. For example, each of the 16-bit buffers 520–555 may have an associated pointer. Because there are eight 16-bit buffers, three-bit pointers are used to uniquely identify each buffer. In one embodiment, the buffer 520 has a pointer value of 000, the buffer 525 has a pointer value of 001, the buffer 530 has a pointer value of 010, the buffer 535 has a pointer value of 011, the buffer 540 has a pointer value of 100, the buffer 545 has a pointer value of 101, the buffer 550 has a pointer value of 110, and the buffer 555 has a pointer value of 111. Thus, each of the 16-bits buffers 520, 525, 530, and 535 that comprise the larger buffer 510 have pointer values in which the most significant bit is "0". Each of the 16-bit buffers 540, 545, 550, and 555 that comprise the larger buffer 515 have pointer values in which the most significant bit is "1".

As stated above, an instruction may occupy a plurality of the 16-bit buffers 520–555. For example, a 64-bit instruction may begin in buffer 525 and end in buffer 540. The pointer value of the buffer 525 at the beginning of the instruction is 001, and the pointer value of the buffer 540 at the end of the instruction is 100. Thus, the most significant bit of the buffer pointer changes from "0" to "1", thereby indicating a transition from the buffer 510 to the buffer 515. By comparing the most significant bits of the pointers to the buffers 520–555, the transition between the buffers 510 and 515 may be determined.

In another embodiment of the invention, counters are used to manage the number of requests made to load the buffers. Each time a load request is made, the counter may be incremented. The counter may decrement when the buffer is emptied. When the value of the counter equals the number of buffers, the present invention stops making requests. Therefore, the counters may be checked prior to issuing a load request to determine if a buffer is available to accept data.

Numerous variations and modifications of the invention will become readily apparent to those skilled in the art. Accordingly, the invention may be embodied in other specific forms without departing from its spirit or essential characteristics.

What is claimed is:

1. A method of aligning instructions in a processor comprising:
    storing a plurality of instructions of different sizes in a plurality of buffer areas, each buffer area including a plurality of sub-buffers, each sub-buffer storing a unit instruction width, with an instruction of greater than a unit instruction width stored in more than one sub-buffer;
    aligning a first instruction from said buffer areas;
    decoding a size of the first instruction;
    selecting at least one of said plurality of sub-buffers from which to output said first instruction on an output part;
    during said outputting, determining a beginning of a second instruction from selected ones of the plurality of sub-buffers based on the size of the first instruction, decoding the size of the second instruction, and determining whether processing the second instruction will deplete any of said plurality of buffer areas based on comparing a most significant bit of a pointer to a first sub-buffer to a most significant bit of a pointer to a second sub-buffer; and
    based on said determining whether processing the second instruction will deplete said plurality of buffer areas, instructing the plurality of buffer areas to receive additional instructions.

2. The method of claim 1, further comprising storing a first instruction across a plurality of sub-buffers prior to processing the instructions.

3. The method of claim 1, further comprising adding the size of the first instruction to a current instruction position to determine the beginning of the second instruction.

4. The method of claim 1, further comprising aligning ahead a number of cycles at least equal to a cache latency such that the determining whether processing the second instruction will deplete said plurality of buffer areas occurs at least said number of cycles before instructing the plurality of buffer areas to receive additional instructions.

5. The method of claim 1, further comprising aligning instructions in a digital signal processor.

6. The method of claim 1, further comprising issuing a request to a memory to reload the plurality of buffer areas.

7. An apparatus, including instructions residing on a machine-readable storage medium, for use in a machine system to align instructions in a processor, the instructions causing the machine to:

store a plurality of instructions of different sizes in a plurality of buffer areas, each buffer area including a plurality of sub-buffers, each sub-buffer storing a unit instruction width, with an instruction of greater than a unit instruction width stored in more than one sub-buffer;

decode a size of a first instruction from said plurality of buffer areas;

select at least one of said plurality of sub-buffers from which to output said first instruction on an output part;

during said outputting, determine a beginning of a second instruction from selected ones of the plurality of sub-buffers based on the size of the first instruction, decode the size of the second instruction, and determine whether processing the second instruction will deplete at least one of the plurality of buffer areas based on comparing a most significant bit of a pointer to a first sub-buffer to a most significant bit of a pointer to a second sub-buffer; and based on said determining whether processing the second instruction will deplete the plurality of buffer areas, instruct the plurality of buffer areas to receive additional instructions.

8. The apparatus of claim 7, wherein a first instruction is stored across a plurality of sub-buffers prior to processing the instructions.

9. A method of processing instructions within a processor, comprising:

storing instructions of different widths within a cache having a plurality of buffer areas, each buffer area having a plurality of subportions, each subportion in the cache storing a unit instruction width, where an instruction of unit width takes up a single subportion in the cache, and an instruction of more than said unit width takes up more than one subportion within the cache;

multiplexing each of the subportions of said cache to an output point, and selecting contents of at least one of said cache subportions as a current instruction;

during said selecting said current instruction, predicting which of said buffer areas within said cache will be depleted of instruction data within a number of cycles approximately equal to a latency of the cache based on comparing a most significant bit of a pointer to a first subportion to a most significant bit of a pointer to a second subportion, and instructing loading of the buffer areas that are predicted to be depleted with additional instruction data.

10. A processor comprising:

a plurality of buffer areas, each buffer area adapted to store a plurality of instructions of different widths in a plurality of subparts, each of said subparts storing a unit instruction width, and said instructions of greater than a unit instruction width being stored in multiple said subparts;

a multiplexer, connected to said plurality of subparts, and selecting and aligning contents of at least one of said plurality of subparts from any of said subparts within said buffer areas as a current instruction; and a predictor, operating to predict when at least one of the plurality of buffer areas will be empty based on comparing a most significant bit of a pointer to a first subpart to a most significant bit of a pointer of a second subpart, and to send a signal to instruct said at least one of the plurality of buffer areas to load additional instruction data.

11. The processor of claim 10, wherein the processor aligns ahead a number of cycles at least equal to a cache latency such that the predicting when at least one of the plurality of buffer areas will be empty occurs at least said number of cycles before sending a signal to instruct said at least one of the plurality of buffer areas to load additional instruction data.

12. The processor of claim 10, wherein the processor is a digital signal processor.

* * * * *